Patented Feb. 22, 1927.

1,618,288

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

ZIRCONIUM OXIDE SILICA COMPOSITE AND METHOD OF MAKING SAME.

No Drawing. Application filed November 6, 1925. Serial No. 67,436.

My invention relates to the derivation of zirconium compounds and composites resulting from the preliminary decomposition of zirconium ores and minerals, the most important of which are baddeleyite and zircon (zirconium silicate), chiefly in the form of acid zirconium solutions that may then be utilized for the preparation of zirconium composite pigments which have great commercial importance.

The objects of my invention are, among other things, the production of an improved zirconium oxide silicon oxide composite with novel and simplified methods of making same after the zircon or baddeleyite has been converted into an acid zirconium solution with the separation of the zirconium as a double zirconium salt of an alkali metal. Such composite product may be successfully used as a suitable white opaquing agent for vitreous enamels in which it possesses great opaquing strength when compared with zirconium silicate even when milled to an extreme degree of fineness.

In the course of my investigations and experiments I have discovered a new and exceedingly economical method of preparing this novel zirconium oxide silicon oxide complex which, though varying little from natural zirconium silicate in chemical proportions of $Zr_2$—$SiO_2$, yet differs from zirconium silicate in that both the zirconium and silicon compounds are to a large extent co-precipitated from the acid solution containing both in solution, and because of their intimate physical association in a chemically uncombined state the product possesses the full value of its zirconium oxide in the form of great opaquing strength but my tests have demonstrated that such product is the equivalent of the best pure zirconium oxide when considered pound for pound of $ZrO_2$ content in terms of opaquing strength. In fact this zirconium oxide silicon oxide complex which I have produced is greatly superior to the most finely milled and purest white zirconium silicate as an opaquing pigment both in opaquing power and in pure whiteness of the enamels in which it is incorporated.

My tests have further shown that this composite product is not zirconium silicate but a very intimate association of zirconium oxide and silicon oxide in a chemically uncombined state; its chemical reactions are distinctively different when compared with the finest milled zircon ($ZrSiO_4$). It is well known that zircon is not materially affected by prolonged treatment with hot concentrated sulphuric acid, whereas my composite product reacts with the zirconium oxide dissolving leaving the silica insoluble. Again zircon is not materially affected by treatment with a dilute sulphuric acid and hydrofluoric acid mixture, whereas my composite product reacts losing the silica as silicon tetrafluorid.

According to my invention the zirconium ore or mineral, for example zircon, is first decomposed by mixing same in a finely milled state with a less, or not to exceed an equal, quantity of alkali, sodium carbonate being preferred because of its cheapness, yielding a charge which when heated from 850° C. to 950° C., preferably about 900° C. forms a mass that does not shrink materially and retains to a large extent its dry character without producing even a semi-pasty mass which is different from those high temperature fusion methods in which the zirconium material is melted with molten alkalis. This decomposition will result in the formation of a zirconium residue readily dissolving in dilute acids (preferably sulphuric) with the silicon carried into the acid solution along with the zirconium. My experiments have demonstrated that such fritted or roasted mass, when disintegrated and leached with water and afterwards mixed with dilute sulphuric acid (20%), will usually show 97% decomposition of the zircon in the ore used where equal weights of zircon and sodium carbonate were mixed and roasted. Such improved methods of decomposing zirconium ores and minerals form the subject matter of my pending application for patent filed in the U. S. Patent Office October 27, 1925, Serial No. 65,243.

The following example will disclose to others how my novel and improved composite product is advantageously prepared.

When the raw material is zirconium silicate (zircon), it is preferable first to treat same by the nitre cake fusion process as set forth in the U. S. Barton and Kinzie Patent No. 1,451,004 of April 10, 1923, to remove therewith entangled impurities, such as rutile, ilmenite, monazite, leaving the zircon crystals or sand in the form of great chemical purity. However such preliminary treatment may be omitted where a cream colored product is preferred to white, in which case some of the titanium oxide can be left in or even introduced into the batch prior to practising my improved methods.

Where baddeleyite is used which contains both free zirconium oxide as well as zirconium silicate, it is sometimes preferable first to extract by hydrochloric acid the several per cent of iron oxide contained before proceeding with the process proper; or this acid extraction of iron may be left to the last as in this process the iron oxide apparently does not become so closely entangled with the major constituents as not to be easily removed.

The ore is finely milled to a point where nearly all will pass through a 325 mesh sieve; wet milling is preferable to dry milling.

Sodium carbonate is incorporated with the milled ore in amount equivalent pound for pound of ore used and the charge is dried; or such milled ore may be separately dried and dry sodium carbonate is mixed with dried ore.

The mixture of equal weights of zirconium ore and sodium carbonate is now roasted in a suitable furnace, such as a rotary kiln of continuous type or a muffle furnace or semi-muffle furnace and heated for several hours at a temperature of about 900° C., or until tests show that the zirconium silica combination as in zircon has been to all practical purposes completely broken up. This roasting treatment apparently results in the formation of sodium zirconate and sodium silicate of a basic nature.

The roasted product is then reduced to a fine state of sub-division, preferably and most conveniently by wet milling in pebble mill with water and discharged. In some cases the slurry can be treated directly with acid, but due to the fact that most zircon minerals contain small amounts of discoloring impurities which are rendered soluble in water by this alkali roasting process, I prefer first to dilute with water and then let the product settle giving the batch several washes by settling decantation, or if desired by direct filtration.

The water insoluble fraction when dried at 110° C. has substantially the following chemical composition:—

| | Per cent. |
|---|---|
| $ZrO_2$ plus traces of other oxides | 55.02 |
| $SiO_2$ | 21.74 |
| $Na_2O$ | 20.77 |

At any rate the washed residue is finally obtained in the form of a slurry; and before adding some sodium chloride or other sodium or like salt it is treated with sulphuric acid made up preferably of 1 volume of 95% $H_2SO_4$ and 1 volume of water. The amount of acid is approximately sufficient to form $Na_2SO_4$ with $Na_2O$ content of sludge, normal zirconium sulphate with the total zirconium fraction of sludge, assuming that the amount of free dilute $H_2SO_4$ insoluble zirconium oxide present is later altered and recombined in more desirable form. The manner or order of addition of these materials one to the other is immaterial, so long as conditions are such that the acid is given an opportunity to dissolve out the soluble zirconium fraction as well as the silicon which is nearly all dissolved. I prefer to adjust the concentration of the solids suspended in water and the acid strength and temperature so that ample time elapses before the mass solidifies; for instance, if the acid were too strong or too hot, or the zirconium silica residue contained too little water, the mass would solidify before the desired solution would have opportunity to be accomplished. I also aim to allow sufficient time to transfer the mass from the mixing vessel to a suitable vessel for solidification to avoid having the mass solidify in a container having an agitator.

The solution containing the fraction of zirconium oxide insoluble in this concentration of acid is then transferred from the mixing vessel into a suitable oven vessel, preferably a vat with sloping sides, and allowed to solidify. This setting up may be hastened by external application of heat. When the charge has set it assumes the nature of a semi-transparent jelly, which can be removed in lumps or in mass and then can be dried. Upon drying the appearance of mass changes to a crystalline structure and does not shrink materially; it also loses its transparent appearance and becomes a white, opaque, pulverulent material which I then treat as follows:—

The mass is charged into a suitable furnace capable of heating to a point where the crystalline and other sulphates are decomposed. During the course of this heat application the sodium chloride, if such is added as indicated, is decomposed and forms $Na_2SO_4$, the zirconium salt decomposes forming zirconium oxide, the sodium in combinations of zirconium and silicon is recombined forming ultimately sodium sulphate, and the silicon compound upon such heating is altered to silicon dioxide. It is assumed that at the initial stage of heating the insoluble zirconium oxide residue is first altered to form either zirconium sulphate or more probably sodium zirconium sulphate; probably all the zirconium crystallizes out in the early stages as sodium zirconium sulphate and if the silicon complexes do not associate chemically they at least are very intimately associated physically from the time both the major part of zirconium and practically all of the silicon exist in solution and also during the setting up and subsequent changes.

When tests on the heated mass show that the zirconium is no longer soluble in water and the dissolved salts are neutral in reaction, the charge is withdrawn from the furnace. The condition of the charge will depend somewhat upon the amount of sodium chloride added and the amount of sodium sulphate present. I prefer to keep the amount of sodium sulphate in the ultimate heated mass below the point where the melted salt would form a fused mass. Under preferred conditions of this process the mass as discharged from the furnace is in the form of dry, only slightly sintered, aggregates. However, sufficient sodium chloride could be added to form $Na_2SO_4$ and HCL by combination with all the sulphuric acid as formed, and in this case the charge would more nearly approach a fusion. However I do not prefer this and will ordinarily prefer to work with a dry charge which may then be handled in dry state. Whether the charge is dry during heating operation or whether it is in state of semi-fusion, or even in a liquid mass does not in the least affect the result.

During the heating of this sulphate mass it is desirable to maintain an oxidizing atmosphere because if the atmosphere is allowed to become of a reducing nature, the sodium sulphate would be reduced to sodium sulphide; such alkaline material would in turn begin to combine with silica and zirconium which should be avoided because the effect is a discoloration of product and combinations of alkali with the zirconium and silicon should be prevented.

The product as discharged from the furnace is then disintegrated with an ample supply of water, preferably by using a pebble mill to break down the aggregates to a very fine state. This requires but a few hours milling when the charge is diluted with water, and by any suitable means, preferably settling and decantation, the soluble sodium sulphate is thoroughly extracted leaving a zirconium oxide silicon oxide complex of great opaquing strength and great whiteness, provided the zirconium ore was relatively pure as the starting material.

When baddeleyite or certain other zirconium ores are used, it is preferable, before completely washing out the sodium sulphate, to digest the charge with a dilute hot mineral acid to remove the soluble iron. Such process leaves the iron compounds in such a state as to be readily soluble in hydrochloric acid for instance.

However if the raw material is a chemically refined zircon silicate mineral no acid extraction is required at the finish since the product will be found to be of a pure white color.

As a practical illustration of the procedure to be followed in working out my improved methods, 100 parts by weight of finely-milled zircon and 100 parts by weight of sodium carbonate are mixed and heated for about three hours at about 900° C. The mass is then cooled and milled with about 400 parts of water for several hours, or until the aggregates are reduced to fine state. The charge is removed from the mill and washed (not excessively) with cold water to remove the dissolved chromium, manganese, etc. This water washing may be omitted if the mineral used is sufficiently free of impurities.

To the slurry volume of about 300 c. c. containing the sodium zirconate, sodium silicate and zirconium oxide is added about 60 grams of sodium chloride which is stirred in and allowed to dissolve; thereafter is added to the charge from 160 to 210 parts of $H_2SO_4$ in form of a dilute solution containing about 1 gram $H_2SO_4$ per cubic centimeter; if the water soluble salts have been removed 160 gms. acid (100%) will suffice. If the salts were not removed about 210 will be required. At any rate the acid preferably at room temperature is added to the slurry also at room temperature making addition as rapidly as possible; the charge will then heat up to about 75° C. If allowed to cool it will set, but I prefer to heat and stir while heating. Upon heating a minute or so the charge will solidify into stiff mass that may be easily handled. I prefer to dry this and then heat at temperature from say 900° to 1050° C. for period of say three hours or until the reactions have taken place. The mass is removed from furnace, disintegrated with ample water, washed well to free it from sodium sulphate, and finally dried.

The composition of a typical complex product from baddeleyite is as follows:—

|  | Per cent. |
|---|---|
| $SiO_2$ | 17.06 |
| $ZrO_2$ | 82.80 |
| $Na_2O$ | 0.16 |

The composition of a product made from chemically refined zirconium silicate is as follows:—

|  | Per cent. |
|---|---|
| $SiO_2$ | 28.94 |
| $ZrO_2$ | 70.80 |
| $Na_2O$ | 0.21 |

In this case the water soluble material from the soda ash roast was removed before acid treatment.

It will be seen that this process lends itself to treatment of a variety of zirconium ores and to the alteration and reformation of zirconium and silicon contents thereof into more powerfully opaque and less highly colored products.

The advantages of my improved methods of preparing such composites reside largely in bringing both the zirconium and silicon into solution and then through heat to cause a co-precipitation of at least a part of the silicon compounds as a gelatinous mass thoughout with which the zirconium compound is intimately mixed. As the heating progresses the zirconium compound crystallizes probably as sodium zirconium sulphate; finally when the mass has dried it becomes a white, opaque, powdery mass containing the double zirconium salt in the form of minute crystals intimately mixed or associated with the amorphous silicon compound. This charge when calcined and extracted with water yields the composite product in which the zirconium oxide and silicon oxide retain their individual identities though in intimate physical association.

Other acids than sulphuric acid may be used as an addition to the charge, for example, hydrochloric or nitric or oxalic acids, which are effective solvents for the zirconium and silicon in the roasted mass. In case hydrochloric or nitric acid was employed, I would add a sulphate, such as sodium sulphate, potassium sulphate, or the equivalent in the form of a mixture of sodium chloride or potassium chloride and sulphuric acid which upon heating would cause the zirconium to separate as a double potassium zirconium sulphate or a mixture of the two.

Sodium chloride is preferably used in my process on account of its cheapness and also because it forms sodium sulphate and hydrochloric acid which is more readily expelled from the charge than sulphuric acid.

I claim as my invention:

1. The method of preparing a zirconium oxide silica composite which comprises heating zirconium-containing material with a less quantity of an alkali to substantial decomposition of said material, treating the residue with acid to obtain both zirconium and silicon compounds in solution, then heating the charge in the presence of sufficient alkali metal compound to precipitate the zirconium compound as a double zirconium salt of the alkali metal, and finally drying the resulting product.

2. The method of preparing a zirconium oxide silica composite which comprises heating zirconium-containing material with a less quantity of an alkali to substantial decomposition of said material, leaching the resulting product with water, treating the residue with sulphuric acid to obtain both zirconium and silicon compounds in solution, then heating the charge in the presence of sufficient alkali metal compound to precipitate the zirconium compound as a double zirconium salt of the alkali metal, and finally drying the resulting product.

3. The method of preparing a zirconium oxide silica composite which comprises heating zirconium-containing material with a less quantity of an alkali to substantial decomposition of said material, leaching the resulting product with water, treating the residue with acid to obtain both zirconium and silicon compounds in solution, then heating the charge in the presence of sufficient sodium chloride to precipitate the zirconium compound as a double sodium zirconium salt, and finally drying the resulting product.

4. The method of preparing a zirconium oxide silica composite which comprises heating zirconium-containing material with a less quantity of an alkali to substantial decomposition of said material, leaching the resulting product with water, treating the residue with sulphuric acid to obtain both zirconium and silicon compounds in solution, then heating the charge in the presence of sufficient sodium chloride to precipitate the zirconium compound as a double sodium zirconium salt, and finally drying the resulting product.

5. The method of preparing a zirconium oxide silica composite which comprises heating zirconium-containing material with a less quantity of an alkali to substantial decomposition of said material, leaching the resulting product with water, treating the residue with acid to obtain both zirconium and silicon compounds in solution, then heating the charge in the presence of sufficient alkali metal compound to precipitate the zirconium compound as a double zirconium salt of the alkali metal, calcining the charge to completion of the reactions therein, and leaching the soluble substances from the insoluble chemically uncombined zirconium oxide silica composite.

6. The method of preparing a zirconium oxide silica composite which comprises heating zirconium-containing material with a less quantity of an alkali to substantial decomposition of said material, leaching the resulting product with water, treating the residue with sulphuric acid to obtain both zirconium and silicon compounds in solution, then heating the charge in the presence of sufficient alkali metal compound to precipitate the zirconium compound as a double zirconium salt of the alkali metal, calcining the charge to completion of the reactions therein, and leaching the soluble substances from the insoluble chemically uncombined zirconium oxide silica composite.

7. The method of preparing a zirconium oxide silica composite which comprises heating zirconium-containing material with a less quantity of an alkali to substantial decomposition of said material, treating the residue with acid to obtain both zirconium and silicon compounds in solution, then heating the charge in the presence of sufficient sodium chloride to precipitate the zirconium compound as a double sodium zirconium salt, calcining the charge to completion of the reactions therein, and leaching the soluble substances from the insoluble chemically uncombined zirconium oxide silica composite.

8. The method of preparing a zirconium oxide silica composite which comprises heating zirconium-containing material with a less quantity of an alkali to substantial decomposition of said material, leaching the resulting product with water, treating the residue with sulphuric acid to obtain both zirconium and silicon compounds in solution, then heating the charge in the presence of sufficient sodium chloride to precipitate the zirconium compound as a double sodium zirconium salt, calcining the charge to completion of the reactions therein, and leaching the soluble substances from the insoluble chemically uncombined zirconium oxide silica composite.

9. In the method of preparing a zirconium oxide silica composite from an acid soluble zirconium compound, the steps which consist in leaching same with water, then heating the residue with acid to obtain both zirconium and silicon in solution, and then heating the charge in the presence of sufficient neutral alkali metal compound to precipitate the zirconium compound as a double zirconium salt of the alkali metal.

10. In the method of preparing a zirconium oxide silica composite from an acid soluble zirconium compound, the steps which consist in treating said compound with dilute sulphuric acid to obtain both zirconium and silicon in solution, and then heating the charge in the presence of sufficient neutral alkali metal compound to precipitate the zirconium compound as a double zirconium salt of the alkali metal.

11. In the method of preparing a zirconium oxide silica composite from an acid soluble zirconium compound, the steps which consist in leaching same with water, then treating the residue with dilute sulphuric acid to obtain both zirconium and silicon in solution, and then heating the charge in the presence of sodium chloride to precipitate the zirconium compound as a double sodium zirconium salt.

12. In the method of preparing a zirconium oxide silica composite from zirconium-containing material, the steps which comprise heating the material mixed with a less quantity of an alkali to substantial decomposition of said material without shrinking the mass and forming a zirconium residue soluble in dilute acids, leaching same with water and treating the residue with acid to obtain both zirconium and silicon in solution, then heating the charge in the presence of sufficient neutral alkali metal compound to precipitate the zirconium compound as a double zirconium salt of the alkali metal, and finally drying the resulting product.

13. In the method of preparing a zirconium oxide silica composite from zirconium-containing material, the steps which comprise heating the material mixed with a less quantity of an alkali to substantial decomposition of said material without shrinking the mass and forming a zirconium residue soluble in dilute acids, leaching same with water and treating the residue with acid to obtain both zirconium and silicon in solution, then heating the charge in the presence of sufficient neutral alkali metal compound to precipitate the zirconium compound as a double zirconium salt of the alkali metal, calcining the charge to completion of reactions therein, and leaching the soluble substances from the insoluble chemically uncombined zirconium oxide silica composite.

14. A zirconium oxide silica composite characterized as being an opaque powder essentially white in color and soluble in sulphuric acid leaving the silica insoluble and as consisting, by analysis, preponderatingly of minute, crystalline zirconium oxide and also containing silica in quantity less than said zirconium oxide, said compounds being intimately physically associated, though chemically uncombined, with each other.

15. A zirconium oxide silica composite characterized as being an opaque powder essentially white in color and soluble in sulphuric acid leaving the silica insoluble and as consisting, by analysis, of not less than fifty percent of minute, crystalline zirconium oxide and also containing silica in quantity less than said zirconium oxide, said compounds being intimately physically associated, though chemically uncombined, with each other.

16. A zirconium oxide silica composite characterized as being an opaque powder essentially white in color and soluble in sulphuric acid leaving the silica insoluble and as consisting, by analysis, of not less than fifty percent of minute, crystalline zirconium oxide and also containing silica in quantity less than said zirconium oxide, and less than one percent of sodium oxide, said compounds being intimately physically associated, though chemically uncombined, with each other.

17. A zirconium oxide silica composite characterized as being a calcined product, in form an opaque powder, essentially white in color, and soluble in sulphuric acid leaving the silica insoluble, and as consisting, by analysis, preponderatingly of minute, crystalline zirconium oxide and also containing silica in quantity less than said zirconium oxide, said compounds being intimately physically associated, though chemically uncombined, with each other.

18. As a new composition of matter, a calcined product being an intimately physically associated, but chemically uncombined, product composed of minute crystalline zirconium oxide and silica varying in $ZrO_2$ to $SiO_2$ ratio, viz: ($ZrO_2$—1.80 to $SiO_2$—1) to ($ZrO_2$—7 to $SiO_2$—1), and in form an opaque crystalline powder, essentially white in color, and also soluble in sulphuric acid leaving the silica in amorphous form and insoluble.

19. In the method of preparing a zirconium oxide silica composite from an acid soluble zirconium compound, the steps which consist in leaching same with water, then treating the residue with acid to obtain both zirconium and silicon in solution, and then heating the charge in the presence of sufficient neutral alkali metal compound to precipitate the zirconium compound as a double zirconium salt, calcining the charge to completion of reactions therein, and leaching the soluble substances from the insoluble chemically uncombined zirconium oxide silica composite.

CHARLES J. KINZIE.